July 29, 1941.    F. HERZ    2,250,708
TIME INTERVAL MEASURING MEANS
Filed Jan. 13, 1938
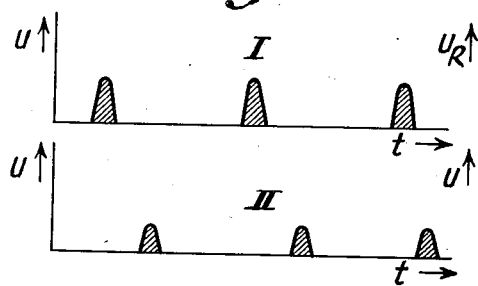
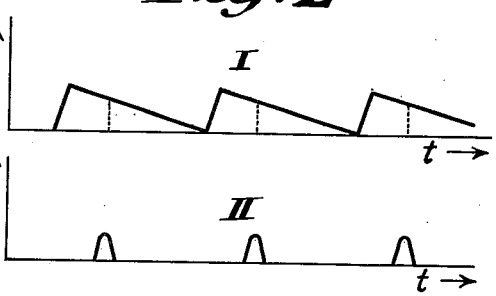
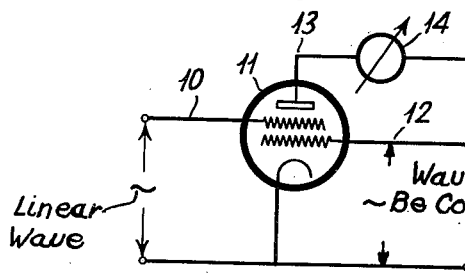
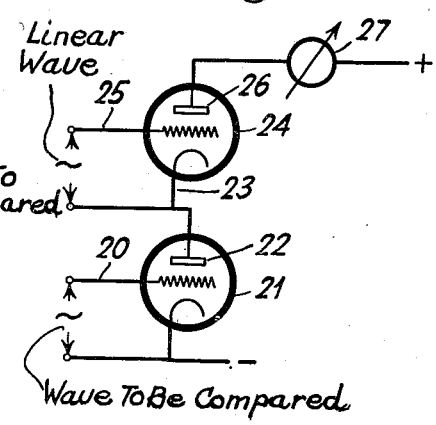
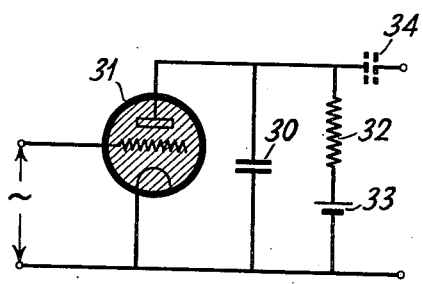
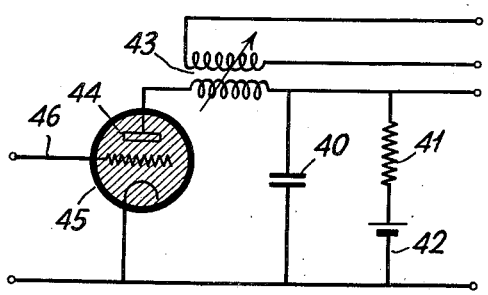
INVENTOR
FRIEDRICH HERZ
BY H. S. Snover
ATTORNEY Patented July 29, 1941

2,250,708

UNITED STATES PATENT OFFICE 2,250,708

TIME INTERVAL MEASURING MEANS

Friedrich Herz, Berlin, Germany, assignor to Telefunken Gesellschaft für Drahtlose Telegraphie m. b. H., Berlin, Germany, a corporation of Germany Application January 13, 1938, Serial No. 184,905
In Germany December 5, 1936

2 Claims. (Cl. 171—95)

My invention relates broadly to electrical measuring circuits, and more particularly to an arrangement whereby the time interval between each of a set of impulses or between each of two sets of impulses may be measured.

At the present time, the time interval between the impulses making up an impulse series or train, or between different series of impulses, is measured mostly by means of the so-called Braun or cathode ray tubes whereby a comparison is made. The solution results in identifying time on a basis of the distance between or interval between the impulses as reproduced on the screen of the tube. This method of measuring is not always favorable due to inherent inaccuracies in the measuring apparatus or the measurement made is insufficient for most purposes.

The present invention discloses ways and means to measure the time interval between the occurrence of an impulse of a given series from a corresponding impulse of another series or a second train of impulses. Of course, this measurement could be made with alternating current impulses of any desired frequency, and in the latter case it might be desirable to rectify the first series of impulses before the measurement takes place inasmuch as the first series of impulses is used to develop a wave form of definite configuration, usually the saw-tooth or serrated wave.

My invention will best be understood by reference to the drawing, in which

Figs. 1 and 2 are explanatory curves,

Fig. 3 is one embodiment of my invention,

Fig. 4 is another embodiment of my invention,

Fig. 5 is a further arrangement employing a Thyratron, and,

Fig. 6 is a still further arrangement.

Fig. 7 shows a combined sawtooth wave generator and mixing tube.

Referring to Fig. 1, there is shown two series of impulses identified as I and II. In accordance with the invention, the impulses of the first impulse series are used in a fashion so as to be converted into saw-tooth oscillations or serrations, or they may be used to control an arrangement adapted to produce a saw-tooth oscillation, and the height of the saw-tooth wave may be measured at the time when the impulse from the second series of impulses occurs. Knowing the constants of the device for producing a saw-tooth wave, if the amplitude be measured at the time that one of the waves of the second series of impulses occurs, then the time interval between the two may easily be calculated or measured.

Referring to Fig. 2, the impulse series of Fig. 1 has been developed into or causes to be developed the saw-tooth wave form shown and identified as I, and the relative position of the impulses forming part of the second series are identified as II. The axis identified as U on the drawing represents the amplitude of the pulse, and this is plotted against time ($t$).

To develop the impulses shown into saw-tooth shaped impulses there may be used either an arrangement whereby a resistance-capacity time circuit is charged and allowed to discharge slowly, or the opposite may occur, that is to say, there may be a slow charging up of a condenser across the resistance member and the discharge may be made sudden or comparatively rapid in nature. The saw-tooth potentials thus developing when impressed upon a control element of a vacuum tube cause the tube to act as a variable direct current resistance whose value is a function of time in accordance with the wave impressed on the grid thereof. The time constants of the saw-tooth wave developing means are naturally chosen so as to be more rapid with respect to time than the interval between the waves identified as I in Fig. 1 so that there may be no overlapping of saw-tooth or serrated wave form potentials.

As shown in Fig. 3, the saw-tooth shaped potentials are impressed on the control 10 across the grid cathode path of a vacuum tube 11, and the second series of impulses may be impressed on a grid 12 across the grid cathode path of the same tube. Connected to the plate 13 is a measuring device 14.

Referring to Fig. 4, the wave to be compared which is a saw-tooth wave may be impressed on the grid 20 of a vacuum tube 21 whose anode 22 is joined to the cathode 23 of a second vacuum tube 24. The saw-tooth series of impulses identified as II are then impressed on the grid 25 of tube 24. Joined to the anode 26 of tube 24 is a measuring instrument 27 which plays the same part as the measuring instrument 14 disclosed in Fig. 3.

The action of the two circuits disclosed in Figs. 3 and 4 is somewhat similar. The effect of the potential or the current in the output circuit of the tube in which the measuring device is connected depends upon the time elapsing between the first and the second set of impulses, it being understood that this refers either to a single impulse or to a rectified train of impulses. The indicator or measuring device may be calibrated to read in units suitable for the practical purposes involved in any given case.

The saw-tooth curves may be generated by the Thyratron arrangement as shown in Fig. 5. Here a condenser 30 is connected in the anode-cathode path of a vacuum tube 31. Joined in parallel to the condenser 30 is a charging resistance 32 in series with a battery 33. The condenser is allowed to charge slowly, and discharge is initiated across the grid cathode path of the tube by means of the first set of impulses. This sawtooth wave may then be impressed on a circuit such as shown in Figs. 3 and 4.

An alternative arrangement to that shown in Fig. 5 is the one illustrated in Fig. 6 which is particularly suitable for use when the impulses such as those of the first series are not regular in form. In this arrangement, a condenser 40 is charged through a charging resistance 41 by means of a battery 42, and this combined circuit is joined through the primary of a transformer 43 to the anode 44 of a vacuum tube 45. Variations in the charge of condenser 30 or 40 may be taken off by means of a condenser 34 shown in Fig. 5 or by means of the transformer 43 as shown in Fig. 6. The condenser or transformer should be of comparatively low impedance. Neither the condenser 34 nor the transformer 43 should include and transfer the slow charging of the condenser.

To secure linear relationship between time and the deflection of the measuring instrument, the curved line of condenser charge may be compensated and neutralized by the curvature in the tube characteristic. For example, the tube could be biased to a point around the lower bend or knee and, for this purpose, there may be utilized the slowly charging condenser voltage. Thus, the slow voltage rise at the completion of the charge will fall within the region of the greatest tube slope. Referring to Fig. 7 there is shown a complete sawtooth wave generator combined with the mixing tube and comprising a combination of the showings of Figs. 3 and 5. Like reference characters refer to the same parts as in those figures.

What I claim is:

1. An apparatus for measuring the time interval between two electric waves which comprises means for developing from one of said waves a linearly changing wave, means for combining said linearly changing wave and the other of said waves and means for measuring the amplitude of said linearly changing wave at the time of combining of the two waves.

2. An apparatus for measuring time intervals between electrical impulses comprising means for developing a sawtooth shaped wave form under the control of one set of said impulses, a thermionic vacuum tube having an anode, cathode, and a plurality of grid electrodes, means for impressing said developed sawtooth shaped wave form onto one of the control electrodes of said tube, means for impressing another of said sets of impulses onto another control electrode of said tube and current measuring means connected in the anode-cathode circuit of said tube for indicating the value of the maximum current in the anode-cathode circuit.

FRIEDRICH HERZ.